Patented Feb. 1, 1949

2,460,745

UNITED STATES PATENT OFFICE 2,460,745

PROCESS OF PREPARING N-ALKYLATED COMPOUNDS OF CONDENSED ARYL-PYRROLS

Harry W. Grimmel and Harlan B. Freyermuth, Easton, Pa., assignors to General Aniline & Film Corporation, New York, N. Y., a corporation of Delaware No Drawing. Application June 28, 1944, Serial No. 542,628

7 Claims. (Cl. 260—319)

The present invention relates to a process of preparing N-substituted compounds of the pyrrole series in which one pyrrole ring is fused onto a carbocyclic radical.

Indole itself has been prepared from the corresponding non-substituted hydrazine with good yield. Heretofore it has been proposed to prepare N-substituted indoles from the corresponding asymmetric hydrazines, which in turn are obtained by the reduction of the N-nitroso derivative of the corresponding secondary amine. However, the preparation of N-substituted indoles by this method gives unsatisfactory low yields.

In those pyrrole derivatives wherein the alpha and beta carbon atoms are not a part of a homocyclic ring system, the alpha and beta carbon atoms are highly reactive and treatment with methyl iodide, for example, yields a mixture of skatol and N-methyl indole. Beilstein, vol. XX/XXII, p. 124. Therefore, it was to be expected that attempts to attach an alkyl group to the nitrogen atom by reaction with an alkylating agent would yield mixtures of the C-alkylated indoles, with inferior yields of the former, and which mixture is difficult to separate. Also attempts to alkylate such indole derivatives by treating the alkali metal compounds with an alkylating agent have not been satisfactory and in general produce mixtures of alkylated and unalkylated compounds with inferior yields.

Heretofore, it has been proposed to prepare N-alkyl pyrroles of the carbazole type by reaction of an alkylating agent in the presence of an organic solvent and a caustic alkali as an acid binding agent, special precautions being taken to prevent the presence of more than about 3% water. However as commercial caustic alkali contains a high proportion of water not easily given up this process entails a special treatment of the caustic alkali to remove water therefrom and special handling of the anhydrous caustic alkali before introducing it in the alkylation reaction.

In accordance with the present invention it has been found that N-alkyl substituted compounds of pyrrols in which the pyrrole ring is condensed with a carbocyclic ring may be prepared by direct treatment with a suitable alkylating agent in the presence of alkali metal hydroxide and an inert solvent forming an azeotropic mixture with water, with simultaneous azeotropic removal of water, the presence of water in the alkali metal hydroxide not being deleterious. By the term condensed arylpyrrols is meant compounds having the pyrrol nucleus condensed with one or more carbocyclic nuclei which may contain substituents in the carbocyclic nucleus or the pyrrol nucleus.

The invention is particularly applicable to the N-alkylation of indoles, as the reaction, carried out with such compounds, results in selective alkylation of the cyclic nitrogen and substantially no alkylation of the alpha or beta positions. The product obtained is substantially free from non-alkylated indole and yields are high. The process of the present invention has the additional advantage that the caustic alkali may be added in an aqueous solution thus eliminating the problem of dehydrating caustic alkali, the dry grinding of solid caustic alkali, and the problem of handling dry powdered anhydrous caustic alkali, and requires no special precaution regarding the presence of water in the reaction mixture.

In carrying the invention into practice the reaction is carried out in a suitable reaction vessel equipped with a reflux condenser having a vent for escape of an azeotropic mixture connected to a condenser and receiver. Into the reaction vessel is introduced the inert solvent and caustic alkali preferably in the form of an aqueous solution together with the pyrrole compound to be alkylated, and the mixture is then heated to distill off an azeotropic mixture of water and solvent which is collected in the receiver. A suitable alkylating agent is then introduced and the reaction is continued with azeotropic separation of water until no further water is distilled off. The N-substituted derivative produced may be isolated by filtering off the alkali salt produced and distilling off the organic solvent in any suitable manner. If desired, steam distillation may be employed for this purpose. In view of the ease with which the alkali metal pyrroles are hydrolized by water, it was not to be expected that the water in the caustic alkali could be prevented from having a hydrolytic action under the conditions of the reaction.

The pyrrole which may be N-alkylated according to the present invention may be represented by the generic formula:

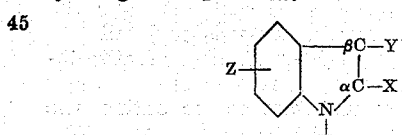

wherein X and Y stand for hydrogen, aralkyl, alkyl, aryl, carboxyl or X and Y together form part of a carbocyclic ring, and Z represents a monovalent substituent, such as, for example, aralkyl, alkyl-, aryl-, nitro- or halogen. In particular, the preferred pyrroles are indoles, that is, those wherein the alpha and beta carbon atoms are not a part of a homocyclic ring system, that is, wherein X and Y stand for hydrogen, aralkyl-, alkyl-, aryl- or carboxyl-. Examples of suitable compounds among others are 2-phenylindole, 5-methyl-2-phenyl-indole, 2-methylindole, indole, 3-methylindole, 2-tertiary butylindole, indole-α-carboxylic acid, indole-β-carboxylic acid, carbazole, and 3-nitrocarbazole. Any alkylating agent which is not volatile to any great extent at the temperature of the azeotropic distillation may be employed. Generally, we prefer to employ as alkylating agents the various alkyl esters containing the desired alkyl group to be introduced, and in particular we prefer to use the dialkyl sulfates, such as dimethyl- and diethyl-sulfates. Other examples of alkylating agents that are suitable are benzyl chloride, methyl benzenesulfonate, methyl-p-toluenesulfonate, n-butyl-p-brombenzenesulfonic acid, and higher alkyl sulfoxy esters.

Caustic soda or caustic potash may be employed as the alkali metal hydroxide, although the latter is preferred, and the amount of water present may be in excess of 3% by weight.

Any inert solvent forming an azeotropic mixture with water may be employed. In particular we prefer to employ inert solvents forming azeotropic mixtures with water having minimum boiling points. Examples of such inert solvents are the aromatic hydrocarbons such as benzene, toluene and xylene, or their substituted derivatives such as chlorobenzene or nitrobenzene. Preferably the reaction is carried out under vacuum conditions, preferably at about 70° C. to facilitate the removal of water. It is also preferred to introduce the alkylating agent gradually to avoid hydrolysis thereof by the water formed in the reaction, although if desired, the total quantity of alkylating agent may be added at one time.

The proportions of solvent and reactive ingredients may be varied through a wide range. Preferably an excess of alkylating agent is employed. In using dialkyl sulfates as alkylating agents, the reaction is carried out with a sufficient excess of dialkyl sulfate so that substantially none of the monoalkyl sulfate formed is hydrolized. An excess of at least one mol, and preferably an excess of one and one-quarter mols is employed. That is, two or more mols of dialkyl sulfate are employed for each mol of indole compound to be alkylated. The amount of inert solvent to be employed also may vary, and we prefer to employ a large excess so as to dissolve all of the initial indole compound and all of the alkylated product formed, and thus provide a homogenous mixture throughout the reaction.

The reaction vessel may be of any suitable material, and is equipped with a water cooled reflux column, a condenser and a water receiver, suitably connected to a vacuum pump, where the reaction is to be carried out under reduced pressure. As such apparatus is well known in the art it will not be described in greater detail.

The invention will be described in greater detail in connection with the following examples which are cited to illustrate the invention, the parts being by weight.

*Example I*

A mixture of 193 parts 2-phenylindole, and 866 parts toluene is refluxed in a vessel equipped with a reflux condenser and moisture receiver and 332.5 parts 66% aqueous caustic potash solution kept at about 50° C. are added slowly, until no more water is given off. There is then added under vacuum reflux, at about 200 mm. mercury pressure and a temperature of 68–70° C., 286 parts dimethylsulfate, the addition taking place slowly over about two hours. The reaction mixture is refluxed at this temperature for about two hours longer, water being collected in the receiver throughout the reaction. When no further water is distilled off the reaction mixture is cooled to about 50° C. and then the potassium methylsulfate is filtered off, the filter cake being washed with about 200 parts toluene. This filtrate is combined with the first filtrate which is then heated to distill off the toluene. The 1-methyl-2-phenylindole obtained distills at 178–180° C. at 4 mm. pressure, and by the nitrate color test shows complete absence of non-methylated indole. If better purity is desired, the material may be recrystallized from 90% ethanol upon which 183 grams having a melting point of 99–101° C. is obtained, which is a yield of about 95% of the theoretical.

*Example II*

193 parts 2-phenylindole and 866 parts toluene are refluxed and 332.5 parts of 66% aqueous caustic potash solution kept at about 50° are added slowly as described in Example I until water no longer comes into the moisture receiver, whereupon 350 parts of diethylsulfate is added under a vacuum of about 200 mm. mercury pressure at a temperature of 67°, the addition being made slowly over about two hours. Refluxing is continued at this temperature for about two hours longer until there is no more water entering the moisture receiver. The reaction mixture is cooled to about 50° C., then the potassium ethylsulfate is filtered off and washed with toluene, the filtrates combined, and the toluene distilled off to recover the 1-ethyl-2-phenylindole.

*Example III*

207 parts 5-methyl-2-phenylindole, 866 parts toluene, 332.5 parts caustic potash and 286 parts dimethylsulfate are reacted as described in Example I in connection with 2-phenylindole. After no further moisture distills off the reaction mixture is steam distilled to remove the toluene and after cooling, the solid residue is filtered off from the aqueous solution of dissolved salts, washed with water and dried. Recrystallization of the filter cake from 95% ethanol results in a yield of 87% of 1,5-dimethyl-2-phenylindole melting at 122–124° C. A color reaction test shows the absence of non-alkylated indole.

*Example IV*

145 parts 2-methyl indole, 866 parts toluene, 332.5 parts 66% aqueous caustic potash solution and 350 parts diethyl sulfate are reacted and the product recovered as described in Example I in connection with 2-phenylindole. There is obtained 1-ethyl-2-methyl indole, as a nearly colorless oil distilling at 165–175° C. at 22 mm. mercury pressure. The product contains no non-alkylated indole.

*Example V*

106 parts 3-nitrocarbazole (obtained by nitration of N-nitrosocarbazole and cleavage of the nitroso group) and 433 parts of toluene are refluxed and 166 parts of 66% caustic potash kept at about 50° are added slowly as described in Example I until water no longer comes into the moisture receiver, whereupon 175 parts diethylsulfate is added gradually during two hours under a vacuum of about 200 mm. mercury pressure at a temperature of about 68–70°. Refluxing is continued at this temperature for about two hours longer until there is no more water entering the moisture receiver. The reaction mixture is cooled to about 50° and the potassium ethylsulfate is filtered off and washed with toluene on the filter. The combined filtrates then are steam distilled to remove all of the toluene and upon cooling the solid precipitate obtained is filtered off, washed with water, and dried. Recrystallization of this filter cake from 95% ethanol resulted in a yield of 71% of 3-nitro-9-ethylcarbazole having a melting point of 126–128°. A color reaction test shows the absence of non-alkylated carbazole.

We claim:

1. The process of producing N-monoalkyl indoles which comprises refluxing a solution of an indole containing the hetero grouping

in an organic solvent therefor which is chemically inert in the reaction and which forms azeotropic mixtures with water, an aqueous solution of caustic alkali in an amount in excess of that theoretically necessary to form the N-alkali indole and a dialkyl sulfate non-volatile at the reaction temperature, the refluxing being continued until no more water is distilled off, and isolating the N-alkyl indole from the reaction mixture.

2. The process for producing N-monoalkyl indoles which comprises refluxing an indole containing the hetero grouping

with an aqueous solution of caustic alkali in excess of that theoretically required to form the N-alkali indole and an organic solvent for the indole which is chemically inert in the reaction and which forms an azeotropic mixture with water, until no more water is distilled off, adding a dialkyl sulfate which is non-volatile at the reaction temperature to the reaction mixture, continuing the refluxing under vacuum until no more water is distilled off, and isolating the N-alkyl indole from the reaction mixture.

3. The process as defined in claim 2 wherein the indole subjected to alkylation contains an aryl substituent on the alpha carbon atom thereof.

4. The process as defined in claim 2 wherein the indole subjected to alkylation is 2-phenyl indole.

5. The process as defined in claim 2 wherein the indole subjected to alkylation is 2-phenyl indole and the dialkyl sulfate is dimethyl sulfate.

6. The process as defined in claim 2 wherein the indole subjected to alkylation is 2-phenyl indole and the dialkyl sulfate is diethyl sulfate.

7. The process as defined in claim 2 wherein the indole subjected to alkylation is 5-methyl-2-phenyl indole.

HARRY W. GRIMMEL.
HARLAN B. FREYERMUTH.

REFERENCES CITED

The following references are of record in the file of this patent:

UNITED STATES PATENTS

| Number | Name | Date |
|---|---|---|
| 1,494,879 | Atack | May 20, 1924 |
| 1,662,061 | Hess et al. | Mar. 13, 1928 |
| 2,010,426 | Burke | Aug. 6, 1935 |
| 2,128,136 | Gloor | Aug. 23, 1938 |
| 2,211,771 | Engel et al. | Aug. 20, 1940 |